Patented May 22, 1945

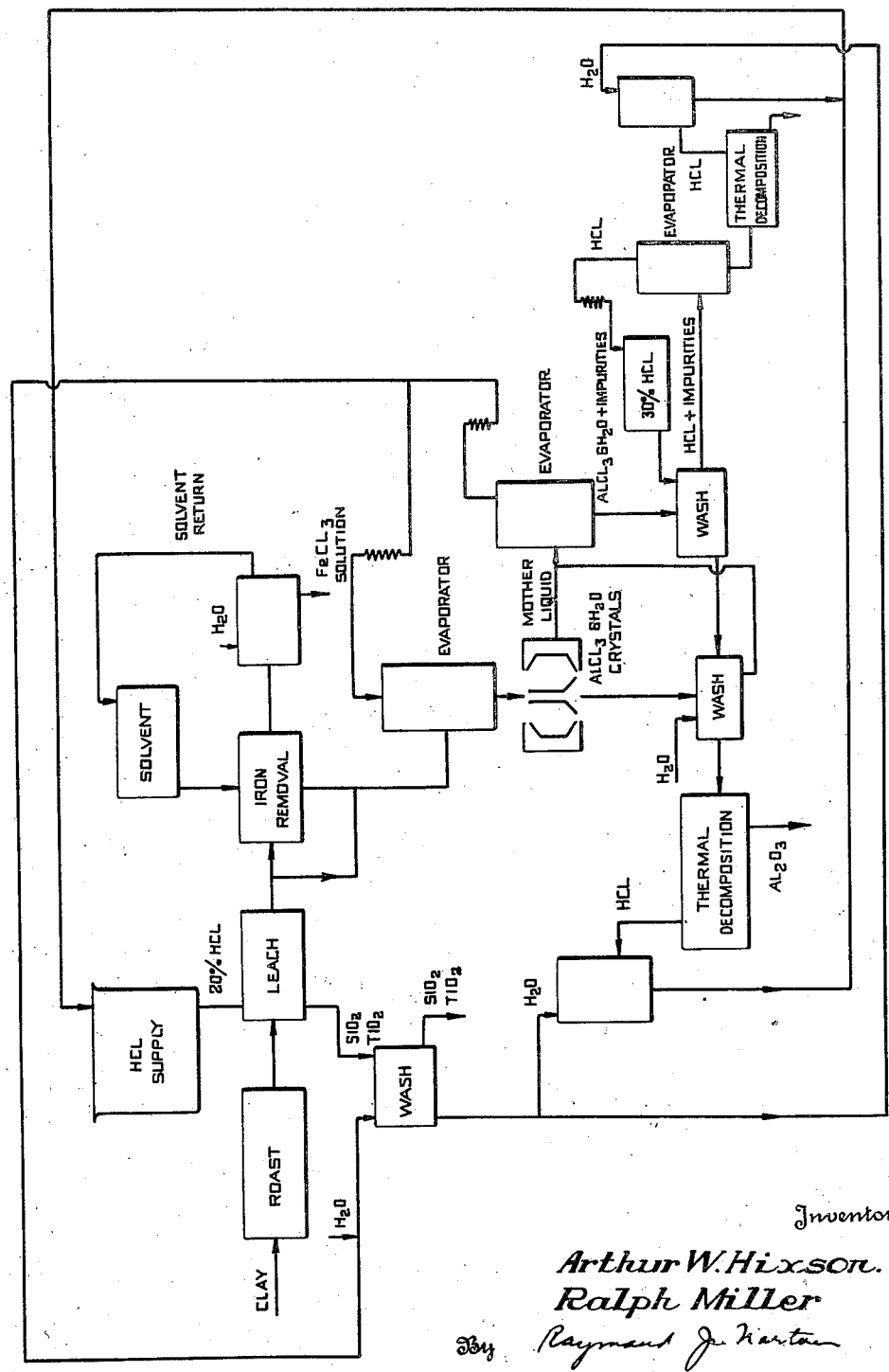

2,376,696

UNITED STATES PATENT OFFICE 2,376,696

PRODUCTION OF ALUMINA

Arthur W. Hixson, Leonia, N. J., and Ralph Miller, New York, N. Y., assignors to The Chemical Foundation, Incorporated, a corporation of Delaware, as trustee Application June 10, 1942, Serial No. 446,504

16 Claims. (Cl. 23—143)

This invention relates to the production of alumina from clays.

As is known the domestic production of alumina has been practically exclusively limited to the treatment of high grade bauxite by the Bayer process. The excessive demands of the war economy coupled with the rapid diminution in domestic sources of high grade bauxite has focused attention on the possibility of producing anhydrous alumina from more abundant aluminum-containing source materials such as the white clays.

As explained in our prior application, Serial No. 413,534, it has been found that alumina may be produced cheaply from clays by a novel acid process. Briefly considered this process involves the roasting of the clay to render it more amenable to an acid leach; the leaching of the rosted product with hydrochloric acid; the separation of the iron chloride from the leach liquor by means of a selective organic solvent and the thermal conversion of the hydrated aluminum chloride sequentially to hydrated alumina and anhydrous alumina.

With such a process it is possible to produce an anhydrous alumina suitable for electrolytic reduction to commercial grades of aluminum. Within a relatively recent period, due to technological improvements in aeroplane construction it has been found that aluminum metal of exceptionally high purity is peculiarly desirable. For the optimum type of aluminum entering the aeronautic field, difficultly attainable specifications attach. The rigorous character of these specifications can be seen from the fact that they call for less than .03% silica, less than .006% titania and practically complete freedom from phosphorus, magnesium and calcium.

In experimentation with the process described in the prior application it has been found that the above specifications are difficult to meet but that with certain novel modifications they can be attained.

The rationale of the new process can best be appreciated by a consideration of certain phenomena attending certain thermal conversions in the earlier method. In such earlier method, as explained, the leach liquor was extracted with isopropyl ether and the acid solution of alumina chloride was evaporated and thermally decomposed to form hydrated alumina. Now it has been found that hydrated aluminum chloride must be heated to about 800° C. to completely decompose it. However, if magnesium is present then such magnesium is converted to an insoluble compound, probably MgO. If hydrated magnesium chloride is thermally decomposed at a temperature of 1000° C. the residue is soluble in dilute hydrochloric acid. In light of this it would be expected that when a mixture of hydrated alumina chloride and hydrated magnesium chloride is thermally decomposed at 1000° C. the magnesium in the residue should be soluble in hydrochloric acid. It has been determined that such is not the case. On the contrary when such a residue is leached at the boiling point with 17% HCl only a small amount of the magnesium will go into solution leaving the remainder to contaminate the ultimate alumina.

The present improved process is predicated on the concept of effectively removing the contaminating materials of the leach liquor. As will be seen this is done by a method of selective crystallization of the aluminum chloride by positively limiting the extent of evaporation of the leach liquor and its removal from the mother liquor in which the magnesium and other undesired impurities are concentrated, followed by a special treatment of the mother liquor to largely recover the contained aluminum chloride free from magnesium and other contaminations.

The operative features and manipulative details of the process will be more readily appreciated by reference to the accompanying drawing in which the process is illustrated in flow sheet form.

In carrying out the process as shown in the flow sheet the argillaceous starting material is first roasted at an appropriate temperature. The roasting operation removes combined water, detroys organic matter, renders the clay more amenable to attack by hydrochloric acid, decreases the tendency of the silica to go in acid solution and converts iron to the ferric state. It has been found that when the ore is roasted at a temperature of the order of 800° C. for about an hour it is readily amenable to a hydrochloric acid leach.

The roasted clay is ground and then leached with 20% hydrochloric acid which is the constant boiling mixture. It has been found that with the proper agitation and leaching time, usually about three hours, it is possible to extract in excess of 90% of the alumina contained in the clay and that the leach liquor is extremely low in silica, of the order of .02% silica based on the alumina present. The insoluble residue, consisting essentially of silica and titania, is separated in the leaching operation and is washed with water recycled from subsequent evaporation steps. The wash water picks up adherent acid, which as shown, is returned to absorb hydrogen chloride evolved in the thermal decomposition steps.

The hydrochloric acid recovered from the leaching operation contains aluminum chloride as well as the soluble impurities, i. e., iron, magnesium, calcium, potassium, etc.

In one method of operation the leach liquor may then be treated to selectively remove the iron. For this purpose the solution is conditioned by fortifying with solid hydrated aluminum chloride and a small amount of free hydrochloric acid and is then extracted with a suitable organic solvent such as isopropyl ether. As explained in copending application, Serial No. 413,534, this may be done in a continuous counter-current extraction system in which the dissolved iron is removed from the solvent and the latter is continuously recycled to the extraction step.

If desired, and as shown in the drawing, the iron extraction step may be omitted and the iron may be separated at a later stage in the process along with the other impurities, i. e., the magnesium, calcium, etc.

The leach liquor recovered from the leaching stage or the de-ironed leach liquor recovered from the solvent extraction stage is then passed to an evaporator and subjected to controlled evaporation. As previously intimated, this evaporation is controlled so as to separate a portion of the contained alumina as crystallized hydrated aluminum chloride and retain all the undesired impurities in the mother liquor. For this purpose the evaporation is controlled short of the point where the mother liquor becomes saturated with any impurity or where one or more of the impurities tend to co-crystallize with the aluminum chloride. It is found that in typical circumstances this may be accomplished by evaporating to the point when between approximately 60% and 80% of the contained alumina chloride crystallize. The extent of evaporation, as will be appreciated, may vary somewhat depending upon the composition of the clay which constitutes the starting material.

The evaporated material, as shown, is passed to a suitable separating device such as an effective filter or centrifuge wherein the crystals of aluminum chloride are separated from the mother liquor. The water removed during evaporation may be utilized in the process in any desired manner, as for example, to absorb the hydrogen chloride evolved from decomposition of the hydrated aluminum chloride.

The separated aluminum chloride is passed to a washing stage wherein it is washed with water to free it from residual mother liquor and the washed crystals are passed to the thermal decomposition stage.

The mother liquor which is separated from the crystallized aluminum chloride is combined with the wash water as shown and this solution is evaporated to dryness. The water evolved during this evaporation may be appropriately utilized in the circuit, as for example, to absorb hydrogen chloride evolved in the thermal decomposition stage, and for washing the insoluble residue from the leaching operation.

The mixed salts recovered in this second evaporation step, as will be appreciated, contains essentially all of the undesired impurities of the starting material together with about 20% of the aluminum chloride content of the leach lliquor. In accordance with a fundamental concept of the invention this residue is then treated with a solution which preferentially dissolves the impurities. It has been found that strong hydrochloric acid, such as 30% HCl serves very effectively for this purpose. While such acid does dissolve some of the aluminum chloride present in the evaporated salt, it does substantially completely dissolve the impurities, such as magnesium, calcium, sodium, iron and the like.

As shown in the flow sheet the contaminated salt mixture is washed, preferably in a continuous counter-current washing system with strong hydrochloric acid. The acid dissolves the undesired impurities, together with some aluminum chloride. The undissolved aluminum chloride is separated from the acid wash and is combined with the first crop of aluminum chloride crystals heretofore described. The aluminum chloride crystals separated in this acid washing stage may be washed with water to remove adherent acid. This may be done in a separate washing stage, or, as shown, the second crop of aluminum chloride crystals may be combined with the first crop and washed at the same time.

The acid wash which is contaminated with dissolved impurities is treated to recover the hydrochloric acid. For this purpose the wash liquor is passed, as shown, to an evaporator wherein the concentrated acid is distilled off and recovered for reuse. The residue from this evaporation step may be thermally decomposed, the hydrogen chloride evolved is absorbed in water and the resulting acid solution is recycled to the leaching operation. The impurities are withdrawn from the thermal decomposition stage and disposed of in any suitable manner.

As will be observed the described method of selective or partial crystallization of the aluminum chloride content of the leach liquor coupled with evaporation of the residue and a wash of such residue with a suitable solvent enables the recovery of a very large percentage of the contained aluminum free from the deleterious impurities.

The washed crystals of hydrated aluminum chloride are passed to a thermal decomposition stage wherein it is heated to a temperature of the order of 800° C. to completely decompose it to alumina. This anhydrous alumina is of high purity and may be electrolyzed to produce aluminum metal of exceptional purity.

In this thermal decomposition stage the hydrogen chloride evolved is recovered and is re-employed in the process as, for example, by recycling it to the leaching operation.

The beneficial results achieved by the improved method will be appreciated from a consideration of typical examples of the effect of the treatment involving the segregation of the leach liquor into the two described fractions, i. e., a crop of pure aluminum chloride crystals produced directly from the leach and a second crop produced from the evaporated mother liquor.

The original liquor was produced as described herein and such liquor was extracted with isopropyl ether to remove iron and then evaporated so as to crystallize 60% (by weight) of the aluminum chloride. The product was centrifuged and was found that the residue weighed 178 grams. The motor liquor was evaporated to dryness at a temperature of about 110° C. The dry salt was then agitated with about 25 cc. of 30% hydrochloric acid and was centrifuged to dryness. The centrifuged product was sprayed with an additional amount of 30% hydrochloric acid while being additionally centrifuged. The residue recovered weighed 88 grams and 55 cc. of wash acid was recovered which was found to contain 17 grams of alumina. The two major products, i. e., the first crop of aluminum chloride crystals and the second crop recovered from hydrochloric wash were analyzed. Analysis show the following:

|  | Yield | Per cent CaO+MgO | Per cent $P_2O_5$ |
|---|---|---|---|
| First crystals | 178 g. (60%) | 0.05 | 0.1 |
| Second crystals | 88 g. (30%) | 0.08 | 0.1+ |
| Wash acid | 54 cc. | 1.0+ | 1.0+ |

The percentage of impurity is based on $Al_2O_3$ in each case.

It will be noted on the above table that the percentage of the impurities in the wash is considerably increased over that contained in each of the first and second crop of crystals.

It is particularly to be observed, for example, that whereas there is .1% $P_2O_5$ in the second crystal crop the percentage of this impurity in the wash liquor was ten times as much. Again whereas the first crop of crystals contained .05% of alkaline earths impurities the wash liquor contained about twenty times as much showing, as pointed out, that the washing step serves to concentrate the impurities in the mother liquor.

To further illustrate the beneficial effect of the idea of removal of impurities by fractionation of the aluminum chloride into proportioned fractions, the following test was made. A synthetic mother liquor (comparable to that produced from a leached clay by crystallization of 80% of the contained aluminum chloride) was made up as follows:

| | Grams |
|---|---|
| $AlCl_3.6H_2O$ | 34.4 |
| $CaCl_2.2H_2O$ | 2.5 |
| $MgCl_2.6H_2O$ | 2.5 |
| $KCl$ | 0.5 |

The above salt mixture was dissolved in an excess of water and the solution was evaporated to dryness. The dry salt was agitated with 100 cc. of 30% hydrochloric acid and the slurry was filtered through a sintered glass disk and sucked dry. The crystals were then washed with several portions of 30% hydrochloric acid and were sucked dry after each wash. The washed crystals weighed 24 grams. The product was analyzed for calcium and magnesium. The results are indicated among the following analysis:

|  | $Al_2O_3$ | MgO | CaO |
|---|---|---|---|
|  | Grams | Grams | Grams |
| Original mixture | 7.3 | 0.49 | 0.95 |
| Final product | 5.1 | 0.024 | 0.017 |

The results of the washing step will be appreciated from the above analysis in which, as will be observed, the percentages of the impurities MgO and CaO in the product washed with strong hydrochloric are greatly less than those in the original mixture, illustrating that as washing continues the ratio of impurities becomes larger in the wash liquor and lower in the washed crystals. The final product as produced above was found to contain 70% of the original aluminum chloride, but 4.8% of the original magnesium content and only 1.8% of the original calcium content.

That these improved results are inherent in the nature of the improved method is seen from the following experiment:

1000 cc. of concentrated iron-free leach solution was evaporated until about 60% of the aluminum chloride had crystallized. The pasty mass was centrifuged to free the mother liquor. The liquor was evaporated and the resulting salt was agitated with 100 cc. of 37% hydrochloric acid solution for about 15 minutes. The slurry was centrifuged and the dry crystals were sprayed with about 30 cc. concentrated hydrochloric acid while whirling. The following table indicates the amount of aluminum chloride in the several fractions.

The two crystal fraction and the wash were analyzed and showed the following:

Original solution contained__ 675 g. $AlCl_3.6H_2O$
First crop of crystals_____ 360 g. $AlCl_3.6H_2O$
Mother liquor _____ 305 cc.
Second crop of crystals_____ 240 g. $AlCl_3.6H_2O$
Wash acid recovered_____ 150 cc.
Wash contained_____ 45 g. $AlCl_3.6H_2O$
Total $AlCl_3.6H_2O$ recovery _____ 645 g.

Analyses

|  | Yield | CaO, MgO | $P_2O_5$ |
|---|---|---|---|
|  |  | Per cent | Per cent |
| First crystals | 360 g. | 0.07 | 0.025 |
| Second crystals | 240 g. | 0.10 | 0.075 |
| Wash acid | 150 cc. | 2.0 | 1.0 |

Percents are based on $Al_2O_3$ content in each case.

It will be appreciated that with proper control of the washing with concentrated hydrochloric acid the impurities in the recovered aluminum chloride may be reduced to extremely small values. Such an operation does, of course, involve some loss of alumina dissolved in the leach liquor. This loss in yield however is more than compensated by the difficultly attainable purity of the recovered alumina.

The loss in yield will be determined essentially by two ratios, namely, the ratio of alumina to the impurities in the leach liquor and the ratio of alumina to the impurities in the separated hydrochloric acid wash.

The first ratio depends upon the composition of the clay which is employed and will be small when employing high grade clays, for example in certain clays of the kaoline type this ratio is of the order of 433 to 1.

The second ratio, as will be appreciated, will depend upon the relative solubility of $AlCl_3.6H_2O$, $MgCl_2.6H_2O$ and $CaCl_2.2H_2O$ in the concentrated hydrochloric acid. Since this ratio in usual circumstances, can be made to approach the order of 2 to 1 the actual loss of alumina in the process is small, i. e., of the order of two parts in 433 parts.

The improved process described herein presents certain unobvious and effective correlations. It has been suggested in the past to produce alumina by the treatment of clays with acids, specifically with hydrochloric acid. It has also been proposed to obtain pure aluminum chloride by evaporating leach liquor and washing the crystals thus produced with hydrochloric acid. Such a method is described in U. S. Patent 1,519,880. In this disclosure however, the major purpose of the acid wash is to remove ferric chloride. Furthermore, such washing was effected with constant boiling hydrochloric acid. It has also been suggested to produce pure aluminum chloride by crystallizing aluminum chloride from leach liquor and washing the crystals with a saturated aluminum chloride solution. Such a method has been disclosed in U. S. Patents 2,189,376 and 2,217,099.

While hydrochloric acid has been suggested in the past to wash impure aluminum chloride crystals it has never been suggested nor had it been thought practical heretofore to use a stronger acid than 20% hydrochloric acid. In the prior art treatments discussed the principal contaminant which was desired to be removed was iron chloride. In order to render such earlier processes feasible it was necessary to subject the acid wash to thermal decomposition in order to recover the acid. Now when a solution containing iron chloride, hydrochloric acid and aluminum chloride is to be thermally decomposed it is practical to effectuate this decomposition only by direct firing, in which the products of combustion come in direct contact with the solution being decomposed. Under these circumstances only a 20% hydrochloric acid solution can be formed if all of the hydrogen chloride is recovered. In the present process, as will be appreciated, by utilizing an organic solvent for the separation of the iron, the iron is removed from the aluminum while the latter is in the form of a solution of aluminum chloride and the hydrochloric acid is used to purify aluminum chloride crystals which are iron-free. By employing a 30% hydrochloric acid solution as the acid wash much higher yields of pure aluminum chloride may be obtained than from a similar treatment in which a 20% hydrochloric acid solution is used as the purifying medium.

In the applicants' process, as will clearly be understood, the wash acid, i. e., the 30% hydrochloric acid is recovered by distillation. In the prior art processes the wash acid solution was subjected to thermal decomposition to recover the total hydrochloric acid associated with the impure wash liquor. In the applicants' process the pure aluminum chloride is fractionally crystallized from the leach liquor, combined with the pure aluminum chloride resulting from the washing step with strong hydrochloric acid, and these combined crystals are thermally decomposed. The residue of impurities, remaining after distillation of the 30% hydrochloric acid similarly are thermally decomposed to recover the hydrochloric acid. This thermal decomposition is carried out by direct fire so that a 20% hydrochloric acid solution is recovered.

The preliminary removal of iron has an unobvious beneficial result in the process. In the earlier methods, as previously noted, a major function of the acid wash was to remove iron. The resultant wash liquor was therefore high in the corrosive ferric chloride. In the past distillation of the wash liquor was not proposed because of the lack of materials which would withstand the corrosive action of hot ferric chloride solutions. If iron is present in the raw material, in substantial quantities and it is not removed prior to the evaporation step then a concentrated ferric chloride solution will be present in the distillation equipment. The possibility of recovering strong hydrochloric acid by a simple distillation method was therefore established only by the correlation herein developed, namely, by the removal of the iron from the leach liquor. It has been determined that the present process may be satisfactorily carried out without the preliminary iron removal if the raw material or clay is very low in iron so that the iron concentration in the wash acid is of such a low order as to be tolerated in the distillation equipment.

The advantages of utilizing the present process, i. e., of fractionally crystallizing a portion of the aluminum chloride in the leach liquor, evaporating the mother liquor and washing this with concentrated hydrochloric acid rather than with 20% hydrochloric acid or with aluminum chloride solution can be the more readily appreciated by a direct comparison of the different methods. The advantage of the applicants' method can be seen by considering the removal of the undesirable KCl as an example. If a saturated aluminum chloride solution is used to wash out the KCl present then 100 grams of saturated solution will contain 30.15 grams of $AlCl_3$ and 3.91 grams of KCl. Therefore, 7.7 times as much $AlCl_3$ will be lost as KCl is present. On the other hand if 32% HCl is employed to purify hydrated aluminum chloride, 100 grams of this acid will dissolve approximately .2 gram of $AlCl_3$ and 1 gram of KCl. Hence but one-fifth as much $AlCl_3$ is lost as KCl. The use of the concentrated hydrochloric acid wash, as will be appreciated, involves the evaporation of considerable amounts of hydrochloric acid and water. Thus if 3.9 grams of KCl are to be washed out, then 66 grams of water must be vaporized if a water wash solution is employed. If a 32% hydrochloric acid solution is employed then 390 grams of the solution are required. Of this solution but about 5 grams are metallic chlorides; hence 319 grams of hydrochloric acid and water must be evaporated additionally to secure this improved yield. It will be observed that a concentrated hydrochloric acid solution is thus highly effective if such solution is regenerated by evaporation rather than subjected to thermal decomposition. Concentrated hydrochloric acid is similarly much more effective as a washing medium than 20% hydrochloric acid. Thus if a 20% hydrochloric acid solution is employed 100 grams of such solution will dissolve 9.1 grams of $AlCl_3$ and .6 gram of KCl. Thus in such a type of washing 15 times as much $AlCl_3$ will be lost as KCl.

In operating the process the total amount of the 32% HCl that is circulated will depend upon the amount of impurities present in the original ore and the total quantity of crystals which are washed. Hence it will be observed that by producing a crop of aluminum chloride crystals in the first evaporator the amount of the strong hydrochloric acid required will be considerably reduced. In the above comparisons KCl has been chosen as characteristic of the impurities because this is the most difficult substance, of the impurities, to remove from hydrated aluminum chloride. A system which insures the removal of KCl will similarly insure the removal of $MgCl_2$ and $CaCl_2$.

It will thus be seen that the process described herein presents many advantages. The several steps of the process are respectively correlated so as to utilize the acid reagent to full advantage. The concept of concentrating the impurities in the leach liquor in a separate minor fraction by treatment with a solvent for the impurities enables the production of high grade alumina from cheap source materials with minimum expenditure for purification.

While an improved embodiment of the invention has been described, it is to be understood that this is given to explain the underlying principles of the invention and not as limiting its effective scope to the particular treatment described.

We claim:

1. A method of producing alumina from argillaceous material relatively high in silica which comprises, roasting the material, leaching the roasted material with hydrochloric acid, evaporating the leach liquor to a degree sufficient to crystallize between 50% and 80% of the contained aluminum chloride; separating the crystals from the mother liquor, evaporating the mother liquor to dryness, washing the residue with concentrated hydrochloric acid to dissolve the impurities, separating the remaining aluminum chloride from the acid wash, and thermally decomposing such aluminum chloride together with the aluminum chloride crystals separated from the mother liquor to produce anhydrous alumina and hydrogen chloride.

2. A method of producing alumina from clays which comprises, roasting the clay, leaching the roasted clay with constant boiling hydrochloric acid, separating the undissolved residue from the leach liquor, evaporating the leach liquor to an extent sufficient to concentrate the impurities short of saturation in the mother liquor and concomitantly crystallize a preponderant amount of the contained aluminum chloride, separating the crystallized aluminum chloride from the mother liquor, washing the separated aluminum chloride and converting it to alumina; evaporating the separated mother liquor to dryness, washing the evaporated residue with concentrated hydrochloric acid to recover an aluminum chloride fraction substantially free from impurities and converting such fraction to alumina.

3. A method of producing alumina from clays which comprises roasting the clay at a temperature of the order of 800° C., leaching the roasted material with constant boiling hydrochloric acid, separating the leach liquor from the undissolved residue, evaporating the leach liquor to a degree sufficient to effect crystallization of up to about 80% of the contained aluminum chloride, separating the crystallized aluminum chloride from the mother liquor, evaporating the mother liquor to dryness; washing the evaporated residue with concentrated hydrochloric acid to recover aluminum chloride free from impurities and treating the aluminum chloride recovered from the evaporated leach liquor and from the acid wash to produce alumina therefrom.

4. A method of producing alumina from clays which comprises, roasting the clay, leaching the roasted material with constant boiling hydrochloric acid, separating the leach liquor from the undissolved residue, evaporating the leach liquor to a degree sufficient to crystallize between about 50% and 80% of the contained aluminum chloride, separating the crystallized aluminum chloride from the mother liquor, evaporating the mother liquor to dryness; washing the residue with hydrochloric acid of approximately 30% concentration to produce an aluminum chloride fraction free from impurities, thermally decomposing the combined fractions of purified aluminum chloride to produce anhydrous alumina; subjecting the concentrated hydrochloric acid wash to distillation to recover acid therefrom and thermally decomposing the residue to recover the hydrogen chloride therefrom.

5. A method according to claim 4 in which the recovered hydrogen chloride is recycled to the leaching step.

6. A method of producing alumina from argillaceous material relatively high in silica which comprises, roasting the material, leaching the roasted material with hydrochloric acid, removing iron from the leach liquor, evaporating the leach liquor to a degree sufficient to crystallize between 50% and 80% of the contained aluminum chloride; separating the crystals from the mother liquor, evaporating the mother liquor to dryness, washing the residue with concentrated hydrochloric acid to dissolve the impurities, separating the remaining aluminum chloride from the acid wash, and thermally decomposing such aluminum chloride together with the aluminum chloride fraction separated from the mother liquor to produce anhydrous alumina.

7. A method of producing alumina from clays which comprises, roasting the clay at a temperature of the order of 800° C., leaching the roasted material with constant boiling hydrochloric acid, separating the leach liquor from the undissolved residue, removing iron from the leach liquor, evaporating the leach liquor to a degree sufficient to effect crystallization of up to about 80% of the contained aluminum chloride, separating the crystallized aluminum chloride from the mother liquor; evaporating the mother liquor to dryness; washing the evaporated residue with concentrated hydrochloric acid to recover aluminum chloride free from impurities and treating the aluminum chloride recovered from the evaporated leach liquor and from the acid wash to produce alumina therefrom.

8. A method of producing alumina from clays which comprises, roasting the clay, leaching the roasted material with constant boiling hydrochloric acid, separating the leach liquor from the undissolved residue, removing iron from the liquor, evaporating the leach liquor to a degree sufficient to crystallize between about 50% and 80% of the contained aluminum chloride, separating the crystallized aluminum chloride from the mother liquor, evaporating the mother liquor to dryness; washing the residue with hydrochloric acid of approximately 30% concentration to produce an aluminum chloride fraction free from impurities, thermally decomposing the purified aluminum chloride to produce anhydrous alumina; subjecting the concentrated hydrochloric acid wash to distillation to recover acid therefrom and thermally decomposing the residue to recover the hydrogen chloride therefrom.

9. A method of producing alumina from clays which comprises, roasting the clay, leaching the roasted material with constant boiling hydrochloric acid, separating the leach liquor from the undissolved residue, evaporating the leach liquor to a degree sufficient to crystallize between about 50% and 80% of the contained aluminum chloride, separating the crystallized aluminum chloride from the mother liquor, evaporating the mother liquor to dryness; washing the residue with hydrochloric acid of approximately 30% concentration to produce an aluminum chloride fraction free from impurities, thermally decomposing the combined fractions of purified aluminum chloride to produce anhydrous alumina, and subjecting the concentrated hydrochloric acid wash to distillation to recover the acid.

10. A method of producing alumina from clays which comprises, roasting the clay, leaching the roasted material with constant boiling hydrochloric acid, separating the leach liquor from the undissolved residue, removing iron from the liquor, evaporating the leach liquor to a degree sufficient to crystallize between about 50% and 80% of the contained aluminum chloride, separating the crystallized aluminum chloride from the mother liquor, evaporating the mother liquor to dryness; washing the residue with hydrochloric acid of approximately 30% concentration to produce an aluminum chloride fraction free from impurities, thermally decomposing the purified aluminum chloride to produce anhydrous alumina; subjecting the concentrated hydrochloric acid wash to distillation to recover acid therefrom.

11. A method of producing alumina from clays which comprises, roasting the clay at an elevated temperature, grinding the roasted clay, leaching the clay with constant boiling hydrochloric acid at the temperature of the boiling point of the solution, separating the leach solution from the insoluble residue, fortifying the leach solution with solid hydrated aluminum chloride and some free hydrochloric acid, extracting the solution with isopropyl ether to remove dissolved ferric chloride, evaporating the iron free solution to dryness, washing the iron free impure aluminum chloride crystals with concentrated hydrochloric acid to remove impurities, thermally decomposing the pure aluminum chloride crystals to produce anhydrous alumina and hydrogen chloride and distilling the strong, contaminated hydrochloric acid to recover the said strong hydrochloric acid and an iron free residue.

12. A process in accordance with claim 11 in which said iron free residue is thermally decomposed to recover hydrogen chloride therefrom.

13. A process in accordance with claim 11 in which the said iron free residue is thermally decomposed to evolve hydrogen chloride, recovering said hydrogen chloride as constant boiling hydrochloric acid and returning such hydrochloric acid to the leaching step.

14. A method of producing alumina from clays which comprises, roasting the clay at an elevated temperature, grinding the roasted clay, leaching the clay with constant boiling hydrochloric acid at the temperature of the boiling point of the solution, separating the leach solution from the insoluble residue, fortifying the leach solution with solid hydrated aluminum chloride and some free hydrochloric acid, extracting the solution with isopropyl ether to remove dissolved iron chloride, partially evaporating the iron free solution to effect the crystallization of a major fraction of the aluminum chloride, separating the aluminum chloride crystals from the mother liquor, evaporating the mother liquor to dryness, washing the impure, iron free, aluminum chloride with concentrated hydrochloric acid, combining both fractions of aluminum chloride crystals, washing said crystals with water to remove adherent liquor and then treating the washed crystals to obtain alumina.

15. A process for obtaining pure alumina from impure aluminum chloride crystals comprising, washing the crystals with strong hydrochloric acid, extracting the contaminated strong hydrochloric acid with isopropyl ether to remove ferric chloride therefrom and then distilling the iron free contaminated acid to recover concentrated, pure hydrochloric acid and iron free residue and converting the residue to alumina.

16. A process in accordance with claim 15 in which the said iron free residue is thermally decomposed to recover the available hydrogen chloride therefrom.

ARTHUR W. HIXSON.
RALPH MILLER.